US007368903B2

(12) United States Patent
Kusuda et al.

(10) Patent No.: US 7,368,903 B2
(45) Date of Patent: May 6, 2008

(54) MEASUREMENT METHOD AND MOBILE INFORMATION DEVICE

(75) Inventors: Hirohisa Kusuda, Tokyo (JP); Daisuke Tsujino, Tokyo (JP); Jun Yamazaki, Tokyo (JP); Yasuhiro Nishide, Tokyo (JP); Hideyuki Ikeda, Tokyo (JP)

(73) Assignee: Vodafone K.K., Tokyo (JP)

( * ) Notice: Subject to any disclaimer, the term of this patent is extended or adjusted under 35 U.S.C. 154(b) by 0 days.

(21) Appl. No.: 11/797,771

(22) Filed: May 7, 2007

(65) Prior Publication Data

US 2007/0241744 A1    Oct. 18, 2007

Related U.S. Application Data

(63) Continuation of application No. PCT/JP2005/020594, filed on Nov. 10, 2005.

(30) Foreign Application Priority Data

Nov. 11, 2004    (JP)    .............................. 2004-327341

(51) Int. Cl.
*G01R 35/00*    (2006.01)
*G01R 33/02*    (2006.01)
(52) U.S. Cl. ................. 324/202; 324/244; 324/247
(58) Field of Classification Search ............... 324/202, 324/244, 247, 260; 702/2, 5, 92; 701/24; 33/355 R, 356
See application file for complete search history.

(56) References Cited

U.S. PATENT DOCUMENTS 7,119,533 B2 *    10/2006    Tamura et al. ............. 324/202

2002/0056202 A1    5/2002    Tamura
2003/0134665 A1 *    7/2003    Kato et al. ................. 455/566

FOREIGN PATENT DOCUMENTS

| EP | 1 314 961 A2 | 5/2003 |
|---|---|---|
| JP | 5-99675 | 4/1993 |
| JP | 7-151842 | 6/1995 |
| JP | 10-185608 | 7/1998 |
| JP | 2002-71771 | 3/2002 |
| JP | 2002-196055 | 7/2002 |
| JP | 2003-90725 | 3/2003 |
| JP | 2003-156549 | 5/2003 |

\* cited by examiner

*Primary Examiner*—Reena Aurora
*Assistant Examiner*—Kenneth J Whittington
(74) *Attorney, Agent, or Firm*—Kratz, Quintos & Hanson, LLP

(57)    ABSTRACT

A measured physical quantity calculating part 41 calculates a measurement result-corrected value obtained by correcting a measurement result of a sensor unit 25 by the use of corrected values for the sensor unit 25. Subsequently, a measurement environment estimating part 42 estimates a terrestrial magnetism measurement environment on the basis of at least one measurement result-corrected value. The estimation result is displayed on a display unit 13 by an estimation result display part 43. In this way, the terrestrial magnetism measurement environment is first estimated and then the terrestrial magnetism is measured by the use of the sensor unit 25. That is, it is possible to measure the terrestrial magnetism by the use of a magnetic sensor mounted on a mobile information device after estimating the terrestrial magnetism measurement environment.

9 Claims, 8 Drawing Sheets

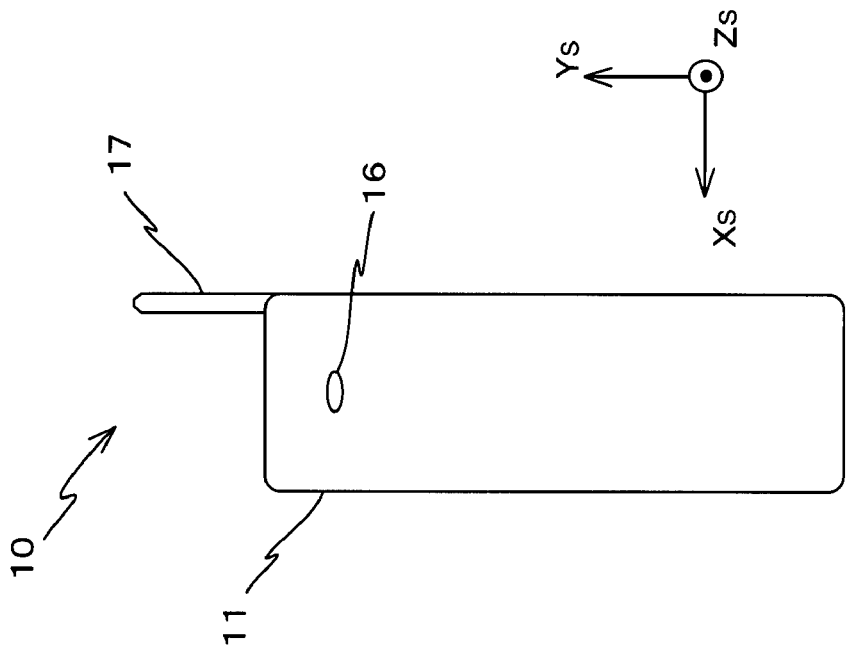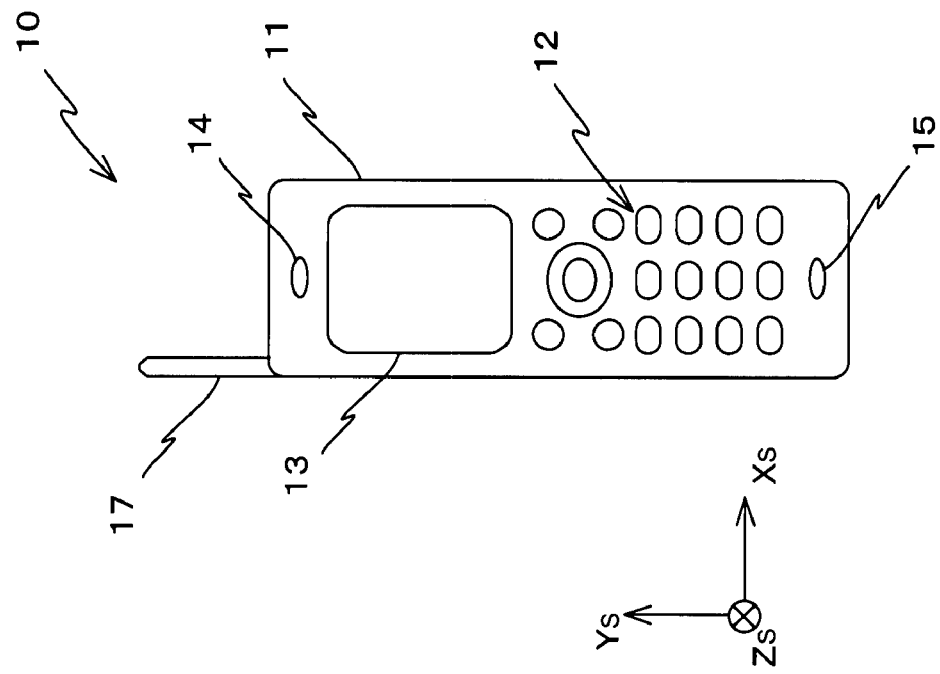

MEASUREMENT METHOD AND MOBILE INFORMATION DEVICE

RELATED APPLICATION

This is a continuation application of the international patent application No. PCT/JP2005/020594 filed with Application date: Nov. 10, 2005. The present application is based on, and claims priority from, J.P. Application 2004-327341, filed on Nov. 11, 2004, the disclosure of which is hereby incorporated by reference herein its entirety.

BACKGROUND OF THE INVENTION

The present invention relates to a measurement method and a mobile information device, and more particularly, to a measurement method of measuring a magnetic flux density derived from the terrestrial magnetism by the use of a sensor mounted on a mobile information device and a mobile information device using the measurement method.

BACKGROUND ART

Conventionally, mobile information devices which are represented by cellular phones and which are capable of operating while moving have been widely used. Technical advancement of such mobile information devices such as cellular phones is brilliant. In addition to the communication function, applications such as various kinds of games are installed in the mobile information devices.

In such mobile information devices, there has been suggested a technology of measuring a magnetic flux density derived from the terrestrial magnetism by the use of a sensor mounted on the mobile information devices and providing useful information to a user by the use of the measurement result. For example, there has been suggested a cellular phone for measuring a magnetic flux density by the use of a three-axis magnetic sensor, calculating a bearing at a current location on the basis of the measured magnetic flux density, and notifying a user of the bearing (see Patent Reference 1: which is hereinafter referred to as "Prior Art 1"). There has been also suggested a cellular phone for measuring a magnetic flux density by the use of a two-axis magnetic sensor, measuring an inclination angle by the use of a two-axis inclination sensor, calculating a bearing at a current location on the basis of the measured magnetic flux density and inclination angle, and notifying the bearing of a user (see Patent Reference 2: which is hereinafter referred to as "Prior Art 2").

[Patent Reference 1] Japanese Unexamined Patent Publication No. 2002-196055

[Patent Reference 2] Japanese Unexamined Patent Publication No. 2003-90725

SUMMARY OF THE INVENTION

<Problem that the Invention is to Solve>

Prior Art 1 or 2 described above uses uniqueness of magnetic flux densities derived from the terrestrial magnetism at locations on the earth other than the vicinities of the terrestrial magnetic poles. Accordingly, a magnetic sensor needs to measure a magnetic flux density derived from the terrestrial magnetism within allowable precision. Therefore, it is necessary to measure the magnetic flux density derived from the terrestrial magnetism in a good measurement environment.

That is, when the mobile information device is placed in the vicinity of a magnetic source with a large magnetic force or the mobile information device is placed in a space shielded well from the terrestrial magnetism at the time of measuring a magnetic flux density by the use of a magnetic sensor, it is not possible to measure the magnetic flux density derived from the terrestrial magnetism with allowable precision. Here, an example of the case where the mobile information device is placed in the vicinity of the magnetic source with a large magnetic force includes a case where large current is generated at the time of departure or arrival of a subway car in a subway and a case where the mobile information device approaches a strong magnet so close to magnetize components around the magnetic sensor. An example of the space shielded well from the terrestrial magnetism includes a room surrounded with a steel plate or the like.

Since magnetism cannot be recognized with human senses, goodness or badness of the terrestrial magnetism measurement environment cannot be judged with a user's recognition. Accordingly, when a user of a mobile information device intends to execute an application using a measurement result of a magnetic flux density derived from the terrestrial magnetism by the use of a sensor mounted on the mobile information device, the user cannot judge whether he or she is in an environment in which the application can be effectively executed. As a result, there is caused a problem that ill-defined abnormal values are obtained by executing the application.

The invention has been made in consideration of the above-mentioned situations and has as an object to provide a measurement method of estimating a terrestrial magnetism measurement environment by the use of a magnetic sensor mounted on a mobile information device and then measuring a terrestrial magnetism.

Another object of the invention is to provide a mobile information device for estimating a terrestrial magnetism measurement environment by the use of a magnetic sensor mounted thereon and then measuring a terrestrial magnetism.

<Means for Solving the Problem>

According to a first aspect of the invention, there is provided a measurement method of measuring a magnetic flux density derived from the terrestrial magnetism by the use of a sensor mounted on a mobile information device, the measurement method including; a magnetic flux density calculating step of calculating a magnetic flux density corresponding to the measurement result of the sensor by the use of a corrected characteristic value of the sensor; and a measurement environment estimating step of estimating a terrestrial magnetism measurement environment on the basis of the calculation result of the magnetic flux density calculating step.

In the measurement method, first, the magnetic flux density corresponding to the measurement result of the sensor is calculated by the use of the corrected characteristic value of the sensor in the magnetic flux density calculating step. Here, the "characteristic value of the sensor" means an offset value of a sensor output or a gain value of the sensor. The gain value is determined depending on the characteristics of the sensor, does not depend on the terrestrial magnetism measurement environment around the sensor, and a specific magnetic field environment and a standard magnetic field generator are necessary for setting the gain value. Accordingly, in general, a gain correction result determined at the time of shipping a mobile information device from a factor is successively used as the corrected gain value. On the contrary, the offset value depends on the terrestrial magnetism measurement environment around the mobile information device. Accordingly, in general, an offset correction result determined at the time of shipping the mobile information device from the factory is used as the corrected offset value until a new offset correcting operation is performed, and the offset value is then updated on the basis of an offset correcting measurement result for updating the offset value in response to an offset value updating instruction from a user.

When the magnetic flux density corresponding to the measurement result of the sensor at that time is calculated using the corrected characteristic value n the magnetic flux density calculating step, the terrestrial magnetism measurement environment is estimated on the basis of at least one calculated magnetic flux density in the measurement environment estimating step. This estimation is performed on the basis of the fact whether it is estimated that the magnetic flux density derived from the terrestrial magnetism can be measured with allowable precision at the time.

Accordingly, according to the measurement method, it is possible to estimate the terrestrial magnetism measurement environment by the use of a magnetic sensor mounted on the mobile information device and to measure the terrestrial magnetism by the use of the magnetic sensor.

The measurement method may further include a beyond-range ratio calculating step of calculating a beyond-range ratio which is a ratio of measurement results, differences of which from an average value of a plurality of measurement results of the sensor are beyond a predetermined range, to the plurality of measurement results, wherein the measurement environment estimating step include estimating the terrestrial magnetism measurement environment on the basis of the calculation result of the magnetic flux density calculating step and the beyond-range ratio.

In this case, the beyond-range ratio which is a ratio of measurement results, the differences of which from the average value of a plurality of measurement results of the sensor are beyond a predetermined range, to the plurality of measurement results is calculated in the beyond-range ratio calculating step. Subsequently, in the measurement environment estimating step, the terrestrial magnetism measurement environment is estimated on the basis of the calculation result of the magnetic flux density calculating step and the beyond-range ratio.

When the magnetic flux density measurement result of the sensor is in an allowable measurement range of the sensor and the beyond-range ratio is small, it is estimated that a magnetic field derived from strong noise magnetism other than the terrestrial magnetism is a normal magnetic field. In this case, it can be judged in the measurement environment estimating step that the magnetic flux density derived from the terrestrial magnetism can be measured with the allowable precision by updating the offset value of the sensor.

On the other hand, when the beyond-range ratio is large, it is estimated that strong noise magnetism other than the terrestrial magnetism exists and the noise magnetism is abnormal. In this case, since the offset value cannot be effectively updated, it can be judged in the measurement environment estimating step that the magnetic flux density derived from the terrestrial magnetism cannot be measured effectively.

Accordingly, when the terrestrial magnetism measurement environment is estimated in the measurement environment estimating step on the basis of the calculation result of the magnetic flux density calculating step and the beyond-range ratio, it is possible to make estimation with higher precision, compared with a case where the terrestrial magnetism measurement environment is estimated using only the calculation result of the magnetic flux density calculating step.

The measurement method may further include an estimation result display step of displaying the estimation result of the measurement environment estimating step on a display unit of the mobile information device. In this case, a user can refer to the estimation result of the measurement environment estimating step. Accordingly, at the time of using the sensor, the user can (i) give up the use of the sensor or (ii) properly cope with the situation by using the sensor after updating the offset value or the like.

The measurement method may further include a measurement data reporting step of reporting the measurement data and the estimation result of the measurement environment estimating step in response to a request for measurement data corresponding to the measurement result of the sensor which is sent from an application operating in the mobile information device. In this case, since the estimation result of the measurement environment estimating step is reported along with the measurement data of the terrestrial magnetism, the application can judge the reliability of the reported measurement data and perform a proper process in accordance with the estimation result.

In the measurement method, the sensor may measure magnetic flux densities in three axis directions perpendicular to each other and defined uniquely in the mobile information device. In this case, it is possible to three dimensionally measure the magnetic flux density and to measure the terrestrial magnetism measurement environment with high precision.

According to a second aspect of the invention, there is provided a mobile information device including: a sensor for measuring a magnetic flux density; magnetic flux density calculating means for calculating a magnetic flux density corresponding to a new measurement result of the sensor by the use of corrected characteristic values of the sensor; and measurement environment estimating means for estimating a terrestrial magnetism measurement environment on the basis of the calculation result of the magnetic flux density calculating means.

In the mobile information device, first, the magnetic flux density calculating means calculates the magnetic flux density corresponding to the measurement result of the sensor by the use of the corrected characteristic value of the sensor. Subsequently, the measurement environment estimating means estimates the terrestrial magnetism measurement environment on the basis of at least one calculated magnetic flux density. That is, in the mobile information device can measure the magnetic flux density derived from the terrestrial magnetism by the use of the above-mentioned measurement method according to the invention.

Therefore, according to the mobile information device, it is possible to estimate the terrestrial magnetism measurement environment by the use of a magnetic sensor and to measure the terrestrial magnetism by the use of the magnetic sensor.

The mobile information device may further include beyond-range ratio calculating means for calculating a beyond-range ratio which is a ratio of measurement results, differences of which from an average value of a plurality of measurement results of the sensor are beyond a predetermined range, to the plurality of measurement results, wherein the measurement environment estimating means estimates the terrestrial magnetism measurement environment on the basis of the calculation result of the magnetic flux density calculating means and the beyond-range ratio.

In this case, at the same time as or at the separate time from the operation of the magnetic flux density calculating means, the beyond-range ratio calculating means calculates the beyond-range ratio which is a ratio of measurement results, the differences of which from the average value of a plurality of measurement results of the sensor are beyond a predetermined range, to the plurality of measurement results. Subsequently, the measurement environment estimating means estimates the terrestrial magnetism measurement environment on the basis of the calculation result of the magnetic flux density calculating means and the beyond-range ratio.

Accordingly, the measurement environment estimating means can make estimation with higher precision, compared with a case where the terrestrial magnetism measurement environment is estimated using only the calculation result of the magnetic flux density calculating means.

The mobile information device may further include a display unit for notifying a user of information; and estimation result displaying means for displaying the estimation result of the measurement environment estimating means on the display unit. In this case, since the estimation result display means displays the estimation result of the measurement environment estimating means on the display unit, a user can refer to the estimation result. Accordingly, at the time of using the sensor, the user can (i) give up the use of the sensor or (ii) properly cope with the situation by using the sensor after updating the offset value or the like.

The mobile information device may further include measurement data reporting means for reporting the measurement data and the estimation result of the measurement environment estimating means in response to a request for measurement data corresponding to the measurement result of the sensor which is sent from an application. In this case, the measurement data reporting means reports the estimation result of the measurement environment estimating means to the application along with the measurement data of the terrestrial magnetism. Accordingly, the application can judge the reliability of the reported measurement data and perform a proper process in accordance with the estimation result.

In the mobile information device, the sensor may measure magnetic flux densities in three axis directions perpendicular to each other. In this case, it is possible to three dimensionally measure the magnetic flux density and to measure the terrestrial magnetism measurement environment with high precision.

The mobile information device may further include a radio communication unit for performing a radio communication with a base station of a mobile communication network. That is, the mobile information device can be used as a mobile communication terminal.

As described above, the measurement method according to the invention provides an advantage that it is possible to measure a terrestrial magnetism after estimating a terrestrial magnetism measurement environment by the use of a magnetic sensor mounted on a mobile information device.

The mobile information device according to the invention provides an advantage that it is possible to measure a terrestrial magnetism after estimating a terrestrial magnetism measurement environment by the use of a magnetic sensor mounted thereon.

BRIEF DESCRIPTION OF DRAWINGS

FIG. 1A is a diagram schematically illustrating an outer appearance of the front side of a cellular phone device according to an embodiment of the invention;

FIG. 1B is a diagram schematically illustrating an outer appearance of the rear side of a cellular phone device according to the embodiment of the invention;

DETAILED DESCRIPTION

Figure 2:
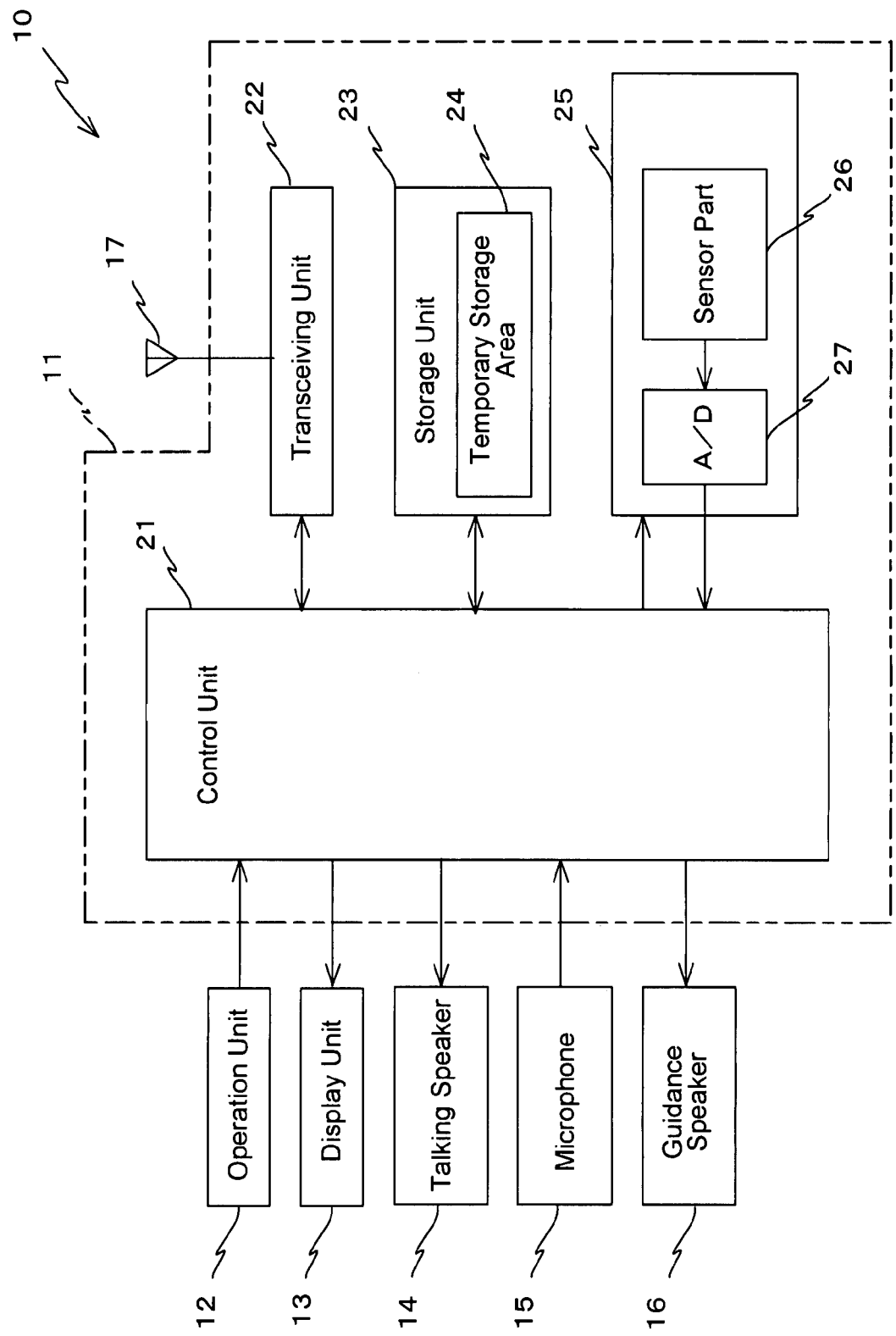
FIG. 2 is a functional block diagram illustrating a configuration of the cellular phone shown in FIG. 1.

Hereinafter, an embodiment of the invention will be described with reference to FIGS. 1 to 8. In the drawings, like or equivalent elements are denoted by like reference numerals and repeated description is omitted.

An outer appearance of a cellular phone 10 as a mobile information device is schematically illustrated in FIGS. 1A and 1B. FIG. 1A shows a front view of the outer appearance of the cellular phone 10 and FIG. 1B shows a rear view of the outer appearance of the mobile phone 10.

As comprehensively shown in FIGS. 1A and 1B, the cellular phone 10 includes (a) a cellular phone body 11, (b) an operation unit 12 having a ten-key pad for inputting a telephone number and function keys for inputting various kinds of instructions for switching an operation mode to a control unit 21 (see FIG. 2) to be described later, and (c) a display unit 13 having a liquid crystal display device for displaying operation guidance, an operation status, a received message, and the like. The cellular phone 10 further includes (d) a talking speaker 14 which reproduces a voice signal sent from a communicating partner at the time of speech communication, (e) a microphone 15 for inputting a sound at the time of sound collection or a voice at the time of speech communication, (f) a guidance speaker 16 which generates a ringing tone or a guidance sound, and (g) an antenna 17 for transmitting and receiving a radio signal to and from a base station.

As shown in FIG. 2, the cellular phone body 11 includes (i) the control unit 21 which collectively controls the entire operations of the cellular phone 10, (ii) a transmission/reception unit 22 which transmits and receives a radio signal to and from the base station through the antenna 17, and (iii) a storage unit 23 having a read only memory (ROM) device or a random access memory (RAM) device for storing programs to be executed by the control unit 21 and various kinds of data. The mobile phone body 11 further includes a sensor unit 25 which measures a magnetic flux density and an acceleration acting on the cellular phone 10 at a current location of the cellular phone 10.

The storage unit 23 includes a temporary storage area 24 for temporarily storing collected measurement data.

The sensor unit 25 includes a sensor part 26 which measures an attitude angle of the cellular phone 10 and an acceleration acting on the cellular phone 10 and outputs the measurement result as an analog voltage signal and an analog-to-digital (A/D) converter 27 which converts the voltage value of the voltage signal from the sensor part 26 into a digital value. The digital data output from the A/D converter 27 is sent as measurement data to the control unit 21. The sensor unit 25 starts its operation in response to a measurement start instruction from the control unit 21 and stops its operation in response to a measurement stop instruction from the control unit 21.

Here, the sensor part 26 an $X_S$-axis magnetic flux density ($B_{XS}$), an $Y_S$-axis magnetic flux density ($B_{YS}$), and a $Z_S$-axis magnetic flux density ($B_{ZS}$) when it is assumed that the row direction in the arrangement of keys in a matrix shape in the operation unit 12 is the $X_S$ axis direction, the column direction is the $Y_S$ axis direction, and the direction perpendicular to a key arrangement plane is the $Z_S$ axis direction. The sensor part 26 measures the $X_S$-axis acceleration ($\alpha_{XS}$) and an $Y_S$-axis acceleration ($\alpha_{YS}$). The sensor part 26 sends a set of voltage values $(V_B)_p$ ($p=X_S, Y_S, Z_S$) as the magnetic flux density measurement results and voltage values $(V_\alpha)_q$ ($q=X_S, Y_S$) as the acceleration measurement results as raw measurement data to the control unit 21.

The relationship between the voltage values $(V_B)_p$ output from the sensor part 26 and the magnetic flux density $B_p$ is expressed by Expression 1, where a gain value is denoted by $(G_B)_p$ and an offset value is denoted by $(V_{BO})_p$:

$$B_p = (G_B)_p \cdot [(V_B)_p - (V_{BO})_p] \quad (1)$$

The gain value $(G_B)_p$ in Expression 1 is adjusted at the time of shipment from a factory so that the gain values are a common value in the $X_S$-axis direction, the $Y_S$-axis direction, and the $Z_S$-axis direction. Here, since the gain value $(G_B)_p$ hardly varies depending on an environmental condition for magnetic measurement and a correction device such as a standard magnetism generator is necessary for the adjustment, the corrected value at the time of shipment from a factory is successively used as a corrected value of the gain value $(G_B)_p$. On the other hand, since the offset value $(V_{BO})_p$ varies variously depending on the environmental condition for magnetic measurement, the offset value can be updated to a new offset value corresponding to the environmental condition for magnetic measurement or a variation with time of the sensor part at that time by performing a correcting measurement operation in the $X_S$-axis direction, the $Y_S$-axis direction, and the $Z_S$-axis direction. The correcting measurement of the new offset value and the updating of the corrected value of the offset value will be described later.

The relationship between the voltage values $(V_\alpha)_q$ output from the sensor part 26 and the accelerations $\alpha_q$ is expressed by Expression 2, where a gain value is denoted by $(G_\alpha)_q$ and an offset value is denoted by $(V_{\alpha O})_q$:

$$\alpha_q = (G_\alpha)_q \cdot [(V_\alpha)_q - (V_{\alpha O})_q] \quad (2)$$

The gain values $(G_\alpha)_q$ and the offset values $(V_{\alpha O})_q$ in Expression 2 are adjusted at the time of shipment from a factory so that the gain values and the offset values are common values in the $X_S$-axis direction and the $Y_S$-axis direction. Here, since the gain values $(G_\alpha)_q$ and the offset values $(V_{\alpha O})_q$ hardly vary depending on the environmental condition for magnetic measurement and a correction device such as a standard acceleration generator is necessary for the adjustment, the corrected values at the time of shipment from a factory are successively used as corrected values of the gain value $(G_\alpha)_q$ and the offset value $(V_{\alpha O})_q$.

The corrected values of the gain value $(G_B)_p$ and the offset value $(V_{BO})_p$ for the measurement of the magnetic flux density and the corrected values of the gain value $(G_\alpha)_q$ and the offset value $(V_{\alpha O})_q$ are stored in the storage unit 23. The corrected values of the gain value $(G_B)_p$, the offset value $(V_{BO})_p$, the gain value $(G_\alpha)_q$, and the offset value $(V_{\alpha O})_q$ can be referred to by a measured physical quantity calculating part 41 (see FIG. 4) to be described later.

In the following description, the corrected values of the gain value $(G_B)_p$, the offset value $(V_{BO})_p$, the gain value $(G_\alpha)_q$, and the offset value $(V_{\alpha O})_q$ which are stored in the storage unit 23 are simply denoted by the gain value $(G_B)_p$, the offset value $(V_{BO})_p$, the gain value $(G_\alpha)_q$, and the offset value $(V_{\alpha O})_q$, respectively.

Figure 3:
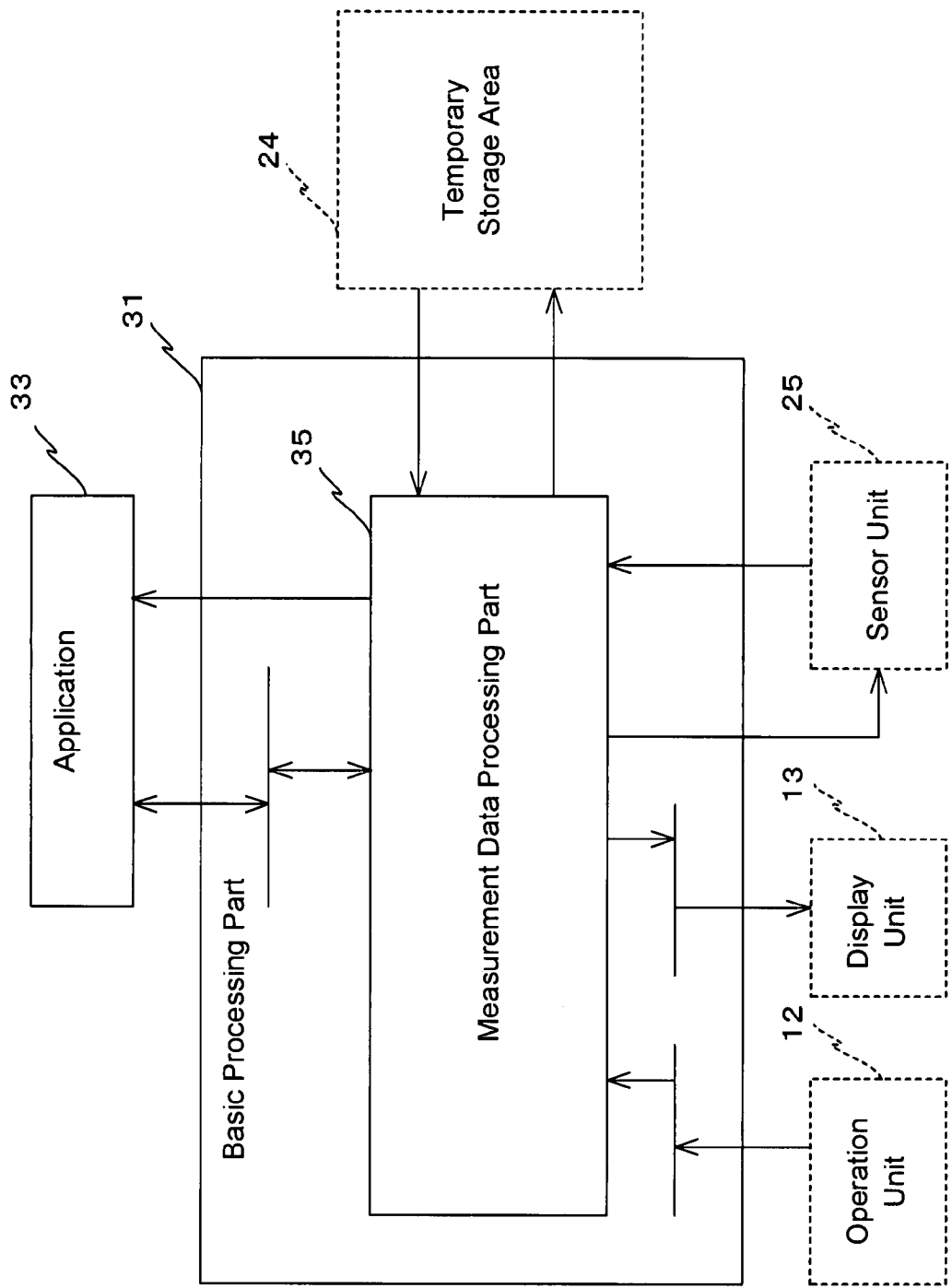
FIG. 3 is a diagram illustrating a configuration of software executed by a control unit shown in FIG. 2.

The control unit 21 includes a central processing unit (CPU) and a digital signal processor (DSP) and serves to perform a variety of data processes and to control operations of the above-mentioned other elements so as to implement a general function as a cellular phone. The software configuration of programs executed by the control unit 21 is shown in FIG. 3.

That is, the software of the control unit 21 includes a basic processing part 31 and an application 33. Here, the basic processing part 31 performs a speech communication function, a mailing function, and a letter input function as basic functions of the cellular phone and controls various hardware resources described above. The application 33 is an application using the measurement result of the sensor unit 25.

Figure 4:
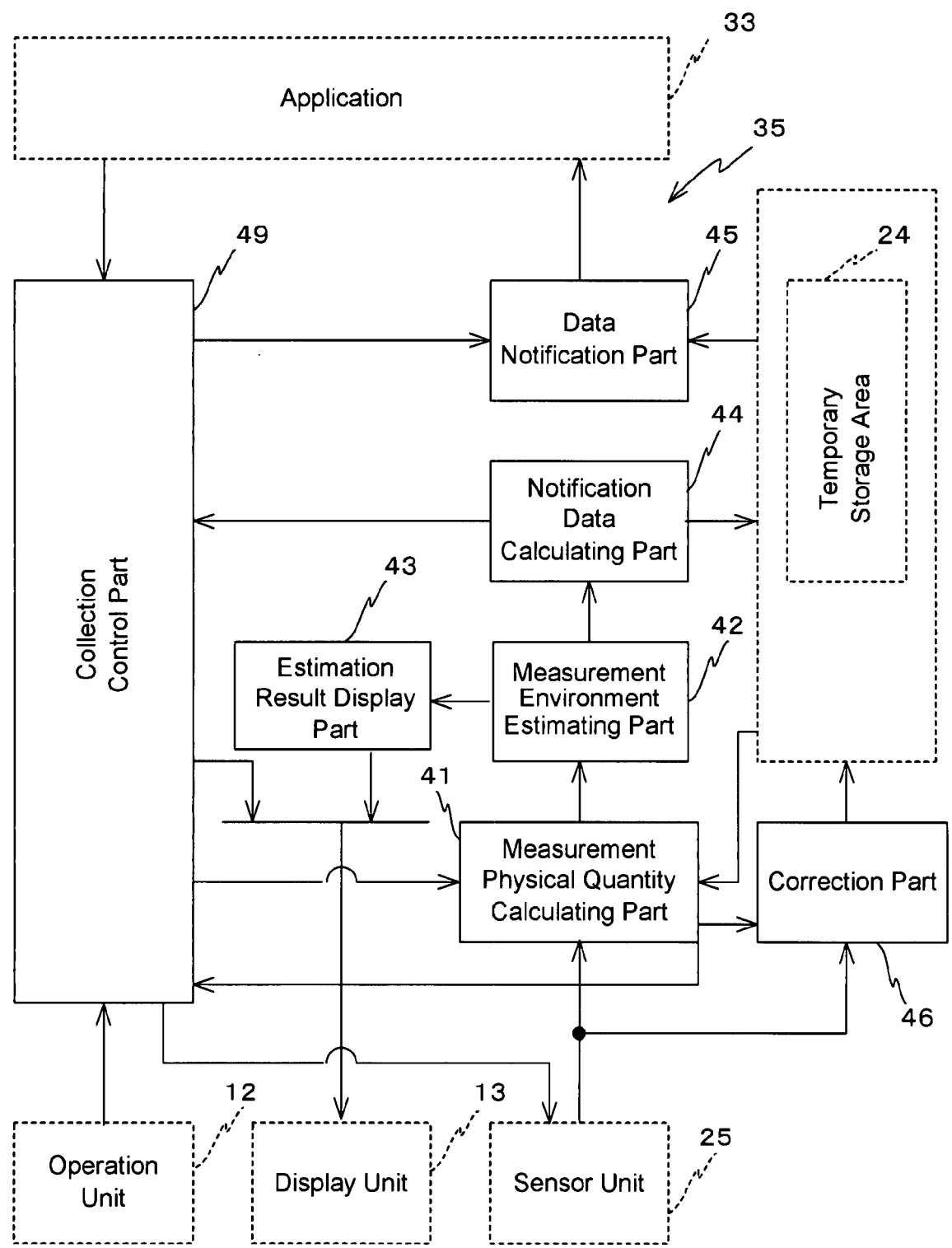
FIG. 4 is a functional block diagram illustrating a configuration of a measurement data processing part shown in FIG. 3.

The basic processing part 31 includes a measurement data processing part 35. As shown in FIG. 4, the measurement data processing part 35 includes (i) a collection control part 49 which processes a command from the application 33 and controls the measurement operation of the sensor unit 25 and the operation of the measurement data processing part 35 and (ii) a measured physical quantity calculating part 41 which receives a raw measurement data from the sensor unit 25 and which calculates the magnetic flux density and the accelerations by the use of Expressions 1 and 2 and by the use of a group of corrected values stored in the storage unit 23.

Figure 5A:
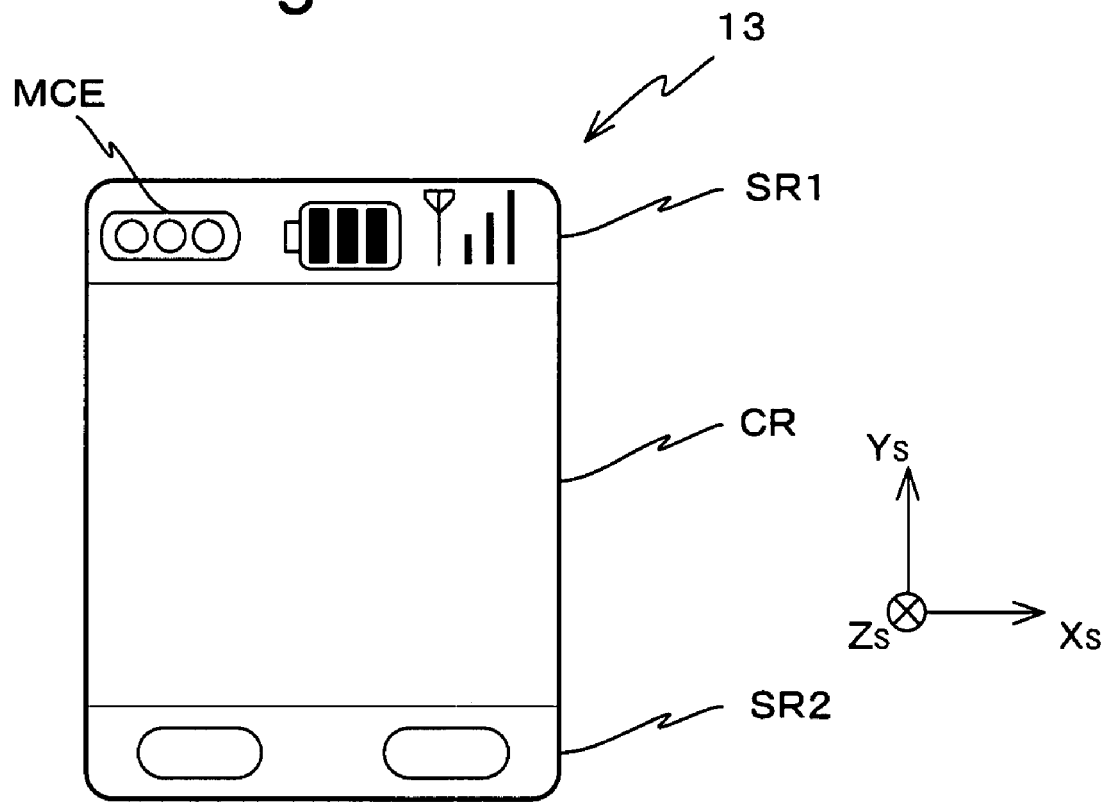
FIG. 5A is a diagram illustrating an example in which an estimation result of a terrestrial magnetism environment is displayed on a display unit shown in FIG. 1.

The measurement data processing part 35 further includes (iii) a measurement environment estimating part 42 which estimates the measurement environment for the terrestrial magnetism on the basis of the magnetic flux density calculation result sent from the measured physical quantity calculating part 41 and (iv) an estimation result display part 43 which displays the estimation result of the measurement environment estimating part 42 on the display unit 13. Here, in this embodiment, a display area of the display unit 13 includes system display regions SR1 and SR2 on which a display operation is performed by only the basic processing part 31 and a common region CR on which a display operation can be performed by both of the basic processing part 31 and the application 33 as shown in FIG. 5A. The estimation result display part 43 displays the estimation result as an estimation result symbol figure MCE in the system in the system display region SR1.

Figure 5B:
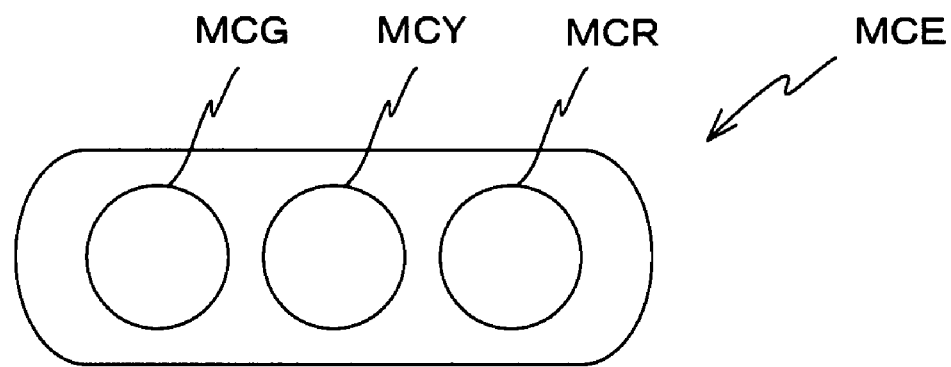
FIG. 5B is a diagram illustrating an estimation result symbol figure shown in FIG. 5A.

As shown in FIG. 5B, the estimation result symbol figure MCE includes a green region MCG, a yellow region MCY, and a red region MCR, similarly to a traffic light. When the measurement environment estimating part 42 estimates that the terrestrial magnetism measurement can be performed with allowable precision, the estimation result display part 43 issues a display instruction for painting the green region MCG with a green color. When the correcting measurement is newly performed to update the corrected value and the measurement environment estimating part 42 estimates that the terrestrial magnetism measurement can be performed with the allowable precision, the estimation result display part 43 issues a display instruction for painting the yellow region MCY with a yellow color. When the correcting measurement is newly performed but the measurement environment estimating part 42 estimates that the terrestrial magnetism measurement cannot be performed with the allowable precision, the estimation result display part 43 issues a display instruction for painting the red region MCR with a red color. When the sensor unit 25 is in an operation stop status and until the measurement environment estimating part 42 outputs the first estimation result after the sensor unit 25 starts its operation, the estimation result display part 43 extinguishes the green region MCG, the yellow region MCY, and the red region MCR.

Referring to FIG. 4 again, the measurement data processing part 35 further includes (v) a notification data calculating part 44 which receives from the measurement environment estimating part 42 the magnetic flux density components and the acceleration components calculated by the measured physical quantity calculating part 41 and the measurement environment estimation result and calculates notification data for notifying the received data to the application 33 and (vi) a data notifying part 45 which sends the notification data to the application 33.

Figure 6A:
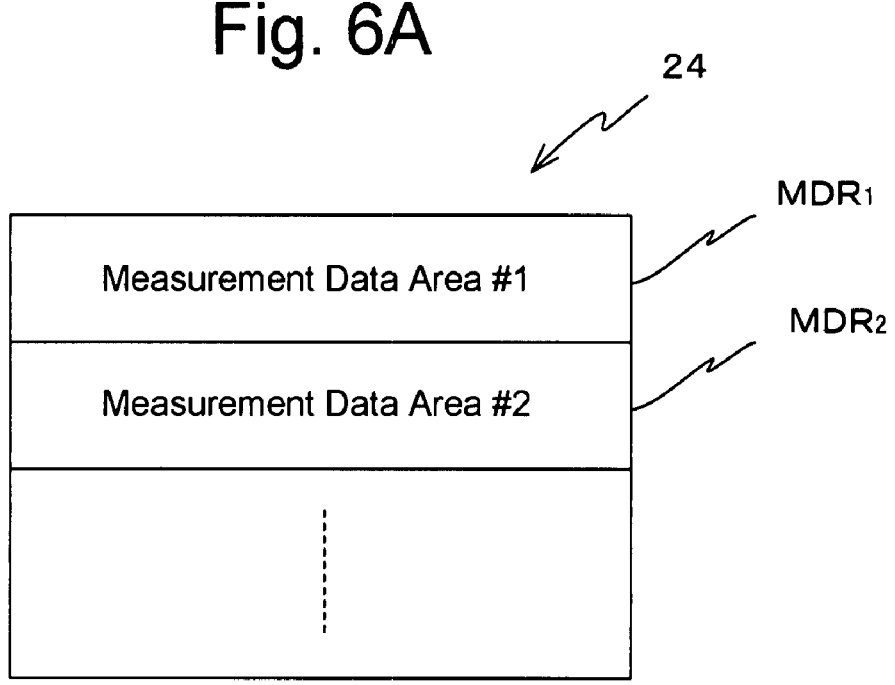
FIG. 6A is a diagram illustrating a configuration of a temporary storage area shown in FIG. 2.
Figure 6B:
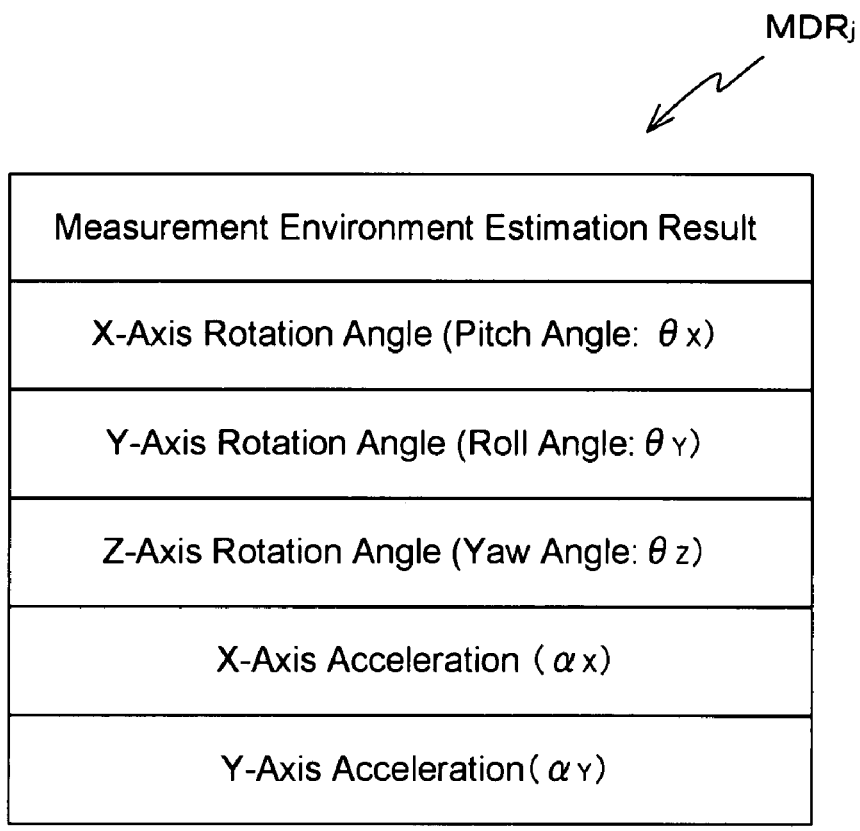
FIG. 6B is a diagram illustrating a configuration of a measurement data area shown in FIG. 6A.

In this embodiment, the notification data calculating part 44 sets as a reference attitude an attitude in which the key arrangement plane of the operation unit 12 is horizontal and the $+Y_S$ direction in the above-mentioned $X_S Y_S Z_S$ coordinate system uniquely defined for the cellular phone 10 is due south. By using the $X_S Y_S Z_S$ coordinate system in the reference attitude as a reference coordinate system (XYZ coordinate system), the notification data calculating part 44 calculates an X-axis rotation angle (pitch angle $\theta_X$), an Y-axis rotation angle (roll angle $\theta_Y$), and a Z-axis rotation angle (yaw angle $\theta_Z$) parallel to the vertical direction, from the reference attitude. The notification data calculating part 44 calculates the X-direction acceleration $\alpha_X$ and the Y-direction acceleration $\alpha_Y$. The calculated pitch angle $\theta_X$, roll angle $\theta_Y$, yaw angle $\theta_Z$, X-direction acceleration $\alpha_X$, and Y-direction acceleration $\alpha_Y$ are stored as the measurement data, which is the notification data, in the temporary storage area 24 along with the measurement environment estimation result at that time. The temporary storage area 24 includes measurement data regions $MDR_1$, $MDR_2$, ..., as show in FIG. 6A. As shown in FIG. 6B, a set of measurement environment estimation result, the pitch angle $\theta_X$, the roll angle $\theta_Y$, the yaw angle $\theta_Z$, the X-direction acceleration $\alpha_X$, and the Y-direction acceleration $\alpha_Y$ are stored in the measurement data regions $MDR_j$ (where j=1, 2, ...).

Referring to FIG. 4 again, the measurement data processing part 35 includes (vii) a correction part 46 which corrects the above-mentioned offset value $(V_{BO})_p$. When receiving a correcting instruction for a correction request issued from the collection control part 49 in response to the correction request from a user through the operation unit 12, the correction part 46 performs a correction operation of the offset value $(V_{BO})_p$. The correction part 46 stores the correction result in the storage unit 23.

Next, a measurement operation using the sensor unit 25 of the cellular phone 10 having the above-mentioned configuration will be described.

It is assumed that the sensor unit 25 starts the measurement operation and periodically (for example, every 20 msec) outputs the raw measurement data in the form of digital. The measurement operation of the sensor unit 25 is started by allowing the collection control part 49 to send a measurement operation start instruction to the sensor unit in response to a request from the user through the operation unit 12.

<Measurement Environment Estimating Process>

When receiving the raw measurement data from the sensor unit 25, the measured physical quantity calculating part 41 of the measurement data processing part 35 calculates the magnetic flux density components and the acceleration components corresponding to the raw measurement data by the use of the gain value $(G_B)_p$, the offset value $(V_{BO})_p$, the gain value $(G_\alpha)_q$, and the offset value $(V_{\alpha O})_q$ which are stored in the storage unit 23 and the corrected characteristic values of the sensor unit 25 and by the use of Expressions 1 and 2. As a result, the magnetic flux density $B_p$ (where p=$X_S$, $Y_S$, $Z_S$) and the acceleration $\alpha_q$ (where q=$X_S$, $Y_S$) corresponding to the measurement result of the sensor unit 25 are calculated. The measured physical quantity calculating part 41 sends the calculated magnetic flux density $B_p$ (where p=$X_S$, $Y_S$, $Z_S$) and the calculated acceleration $\alpha_q$ (where q=$X_S$, $Y_S$) to the measurement environment estimating part 42.

When the values are beyond the allowable measurement range (are overflowed) every set of five sets of measurement results of the sensor unit 25, the sensor unit 25 outputs a signal indicating the overflow. When receiving the signal indicating the overflow, the measured physical quantity calculating part 41 sends the signal to the measurement environment estimating part 42. Hereinafter, the calculation result and the signal indicating the overflow from the measured physical quantity calculating part 41 are comprehensively referred to as a "notification result."

Figure 7:
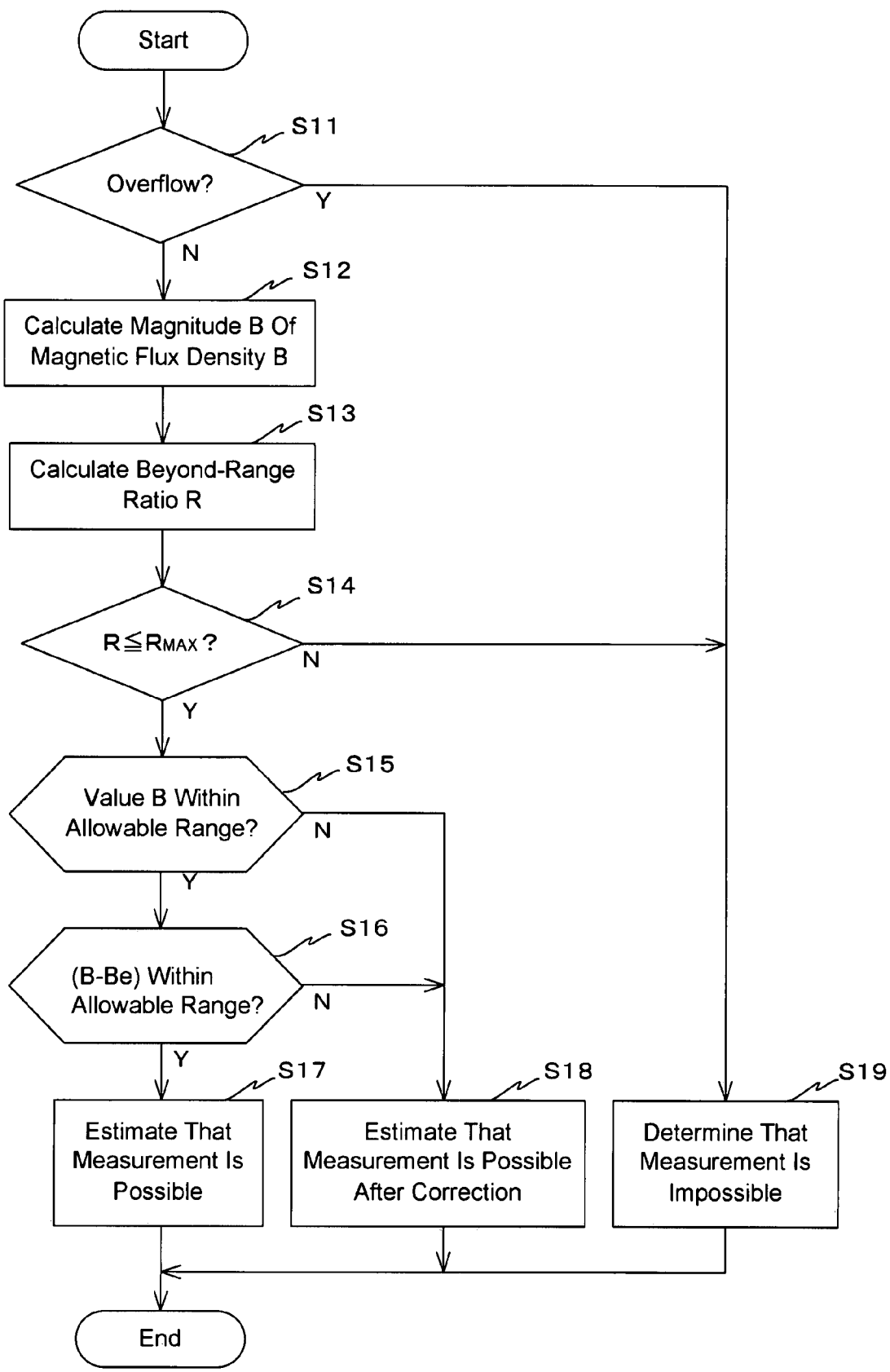
FIG. 7 is a flow diagram illustrating an estimating terrestrial magnetism measurement environment estimating process of a measurement environment estimating part shown in FIG. 4.

In step S11 of FIG. 7, the measurement environment estimating part 42 having received the notification result from the measured physical quantity calculating part 41 judges whether the signal indicating the overflow is included in a predetermined number (for example, 50) of latest notification results. When the judgment result is affirmative, the process of step S19 is performed. In step S19, the measurement environment estimating part 42 estimates at once that the current measurement environment is not an environment where the magnetic flux density derived from the terrestrial magnetism cannot be measured with allowable precision (hereinafter, also referred to as "red-level environment"). Then, the estimation process of the measurement environment estimating part 42 in the measurement environment estimating process is ended.

When the judgment result of step S11 is negative, the process of S12 is performed. In step S12, the measurement environment estimating part 42 calculates the magnitude B of the magnetic flux density from the magnetic flux density $B_p$ (where p=$X_S$, $Y_S$, $Z_S$) by the use of Expression 3, on the basis of the newly calculation result for the magnetic flux density component:

$$B = (B_{XS}^2 + B_{YS}^2 + B_{ZS}^2)^{1/2} \qquad (3)$$

In step S13, the measurement environment estimating part 42 calculates a beyond-range ratio R. At the time of calculating the beyond-range ratio R, the measurement environment estimating part 42 first calculates an average $B_A$ of the magnitudes of the latest calculated number (for example, 50) of magnetic flux densities. Subsequently, the measurement environment estimating part 42 calculates the beyond-range ratio R which is a ratio of the magnitudes of the magnetic flux densities, differences of which from the average value $B_A$ are beyond a predetermined range, to the magnitudes of the predetermined number of magnetic flux densities used to calculate the average value $B_A$. Here, the predetermined range is determined in advance in consideration of the precision with which the magnetic flux density is measured by the sensor unit 25 and the allowable precision for measurement of the magnetic flux density derived from the terrestrial magnetism.

Subsequently, in step S14, the measurement environment estimating part 42 judges whether the beyond-range ratio R is equal to or less than the maximum allowable ratio $R_{MAX}$. When the judgment result is negative, that is, when it is estimated that greatly varying noise magnetism other than the terrestrial magnetism exists in the measurement environment, the process of step S19 is performed. In step S19, the measurement environment estimating part 42 estimates that the measurement environment is the red-level environment. Then, the estimation process of the measurement environment estimating part 42 in the measurement environment estimating process is ended.

When the judgment result of step S14 is affirmative, that is, when noise magnetism exists but it is estimated that the noise magnetism is normal, the process of step S15 is performed. In step S15, the measurement environment estimating part 42 judges whether the differences between the average value $B_A$ and the calculation results of the magnetic flux densities calculated by the measured physical quantity calculating part 41 are in the predetermined range. When the judgment result is negative, the process of step S18 is performed. In step S18, the measurement environment estimating part 42 estimates that the current measurement environment is an environment (hereinafter, also referred to as a "yellow-level environment") where the magnetic flux density derived from the terrestrial magnetism cannot be measured with the allowable precision by using the current corrected characteristic values (gain values and offset values) but may be measured with the allowable precision by newly correcting the offset values $(V_{BO})_p$ (where $p=X_S, Y_S, Z_S$). Then, the estimation process of the measurement environment estimating part 42 in the measurement environment estimating process is ended.

When the judgment result of step S15 is affirmative, the process of step S16 is performed. In step S16, the measurement environment estimating part 42 calculates a difference $\Delta B$ between the calculated magnitude of the magnetic flux density B and the standard magnitude $B_E$ of the magnetic flux density derived from only the terrestrial magnetism. Here, the value $B_E$ depends on the altitude of the cellular-phone 10. On the other hand, when the cellular phone 10 has a current latitude measuring function, the value $B_E$ to be used at that time is determined on the basis of the latitude measurement result. When the cellularphone 10 does not have a current altitude measuring function, the value $B_E$ to be used at that time is determined on the basis of the previous input result of the substantial current position from a user or the set value at the time of shipment from a factory.

Subsequently, the measurement environment estimating part 42 calculates a ratio $(\Delta B/B_E)$ between the value $\Delta B$ and the value $B_E$. Then, it is judged whether the ratio $(\Delta B/B_E)$ is within the allowable range. When the judgment result is negative, the measurement environment estimating part 42 estimates in step S18 that the current measurement environment is the yellow-level environment. Then, the estimation process of the measurement environment estimating part 42 in the measurement environment estimating process is ended.

When the judgment result of step S16 is affirmative, the process of step S17 is performed. In step S17, the measurement environment estimating part 42 estimates that the current measurement environment is an environment (hereinafter, also referred to as a "green-level environment") where the magnetic flux density derived from the terrestrial magnetism can be measured with the allowable precision. Then, the estimation process of the measurement environment estimating part 42 in the measurement environment estimating process is ended.

In this way, when the measurement environment estimation process of the terrestrial magnetism is ended, the measurement environment estimating part 42 notifies the estimation result display part 43 of the estimation result.

The estimation result display part 43 having received the estimation result sends display data corresponding to the estimation result to the display unit 13. That is, when the received estimation result indicates the green-level environment, the display data for lighting only the green region MCG of the estimation result symbol figure MCE in the display unit 13 is sent to the display unit 13. When the received estimation result indicates the yellow-level environment, the display data for lighting only the yellow region MCY of the estimation result symbol figure MCE is set to the display unit 13. When the received estimation result indicates the red-level environment, the display data for lighting only the red region MCR of the estimation result symbol figure MCE is set to the display unit 13. As a result, the display unit 13 performs a display operation corresponding to the terrestrial magnetism measurement environment estimation result, thereby notifying the user of the estimation result.

The measurement data processing part 35 starts the terrestrial magnetism measurement environment estimating process at the same time as starting the operation of the sensor unit 25 and can obtain the first estimation result after receiving the predetermined number of sets of raw measurement data are received. Thereafter, the measurement data processing part 35 repeatedly performs the terrestrial magnetism measurement environment estimating process every time when receiving the raw measurement data from the sensor unit 25.

<Correction Process>

Next, a correction process of the offset value $(V_{BO})_p$ (where $p=X_S, Y_S, Z_S$) will be described. The correction process is performed when a user inputs a correction instruction through the operation unit 12 or the like.

When the user inputs the correction instruction through the operation unit 12, the collection control part 49 of the measurement data processing part 35 receives the correction instruction. The collection control part 49 having received the correction instruction sends an operation stop instruction to the measured physical quantity calculating part 41 and sends a correction process start instruction to the correction part 46. The correction part 46 having received the instruction prepares for a correcting measurement operation. When completing the preparation for the correcting measurement operation, the correction part 46 notifies the collection control part 49 of the fact.

The collection control part 49 having received the fact indicating the completion of the preparation for the correcting measurement operation displays on the display unit 13 an instruction for allowing a user to slowly rotate the cellular phone 10 by 360 degrees about at least two axes intersecting each other and then to input the correcting measurement stop instruction through the operation unit 12. Here, as the two axes intersecting each other, two axes of the $X_S$ axis, the $Y_S$ axis, and the $Z_S$ axis may be selected or three axes of the $X_S$ axis, the $Y_S$ axis, and the $Z_S$ axis may be selected. In this embodiment, the cellular phone is allowed to rotate by 360 degrees about the three axes of the $X_S$ axis, the $Y_S$ axis, and the $Z_S$ axis.

Accordingly, when the user inputs the correcting measurement start instruction, the collection control part 49 receives the correcting measurement start instruction and notifies the correction part 46 of the fact. The correction part 46 having received the fact starts inputting the raw measurement data from the sensor unit 25. Thereafter, the correction part 46 collects the raw measurement data from the sensor unit 25 until the user input the correcting measurement stop instruction.

Figure 8:
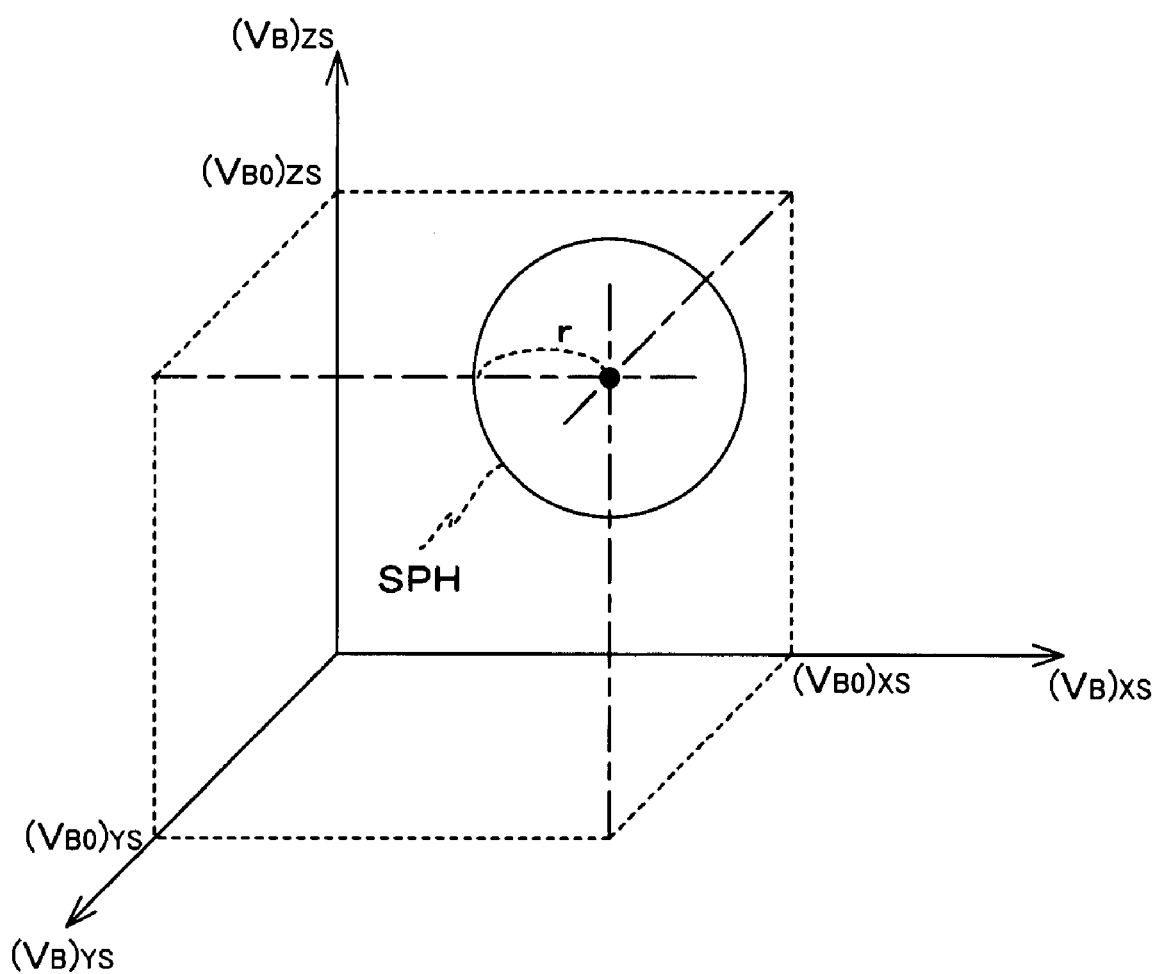
FIG. 8 is a diagram illustrating a correcting measurement result of a correction part shown in FIG. 4.

When the user slowly rotates the cellular phone 10 by 360 degrees about at least two axes intersecting each other in accordance with the instruction at the time of performing the correcting measurement operation and noise magnetism does not exist or is normal, a set of detection voltages $[(V_B)_{XS}, (V_B)_{YS}, (V_B)_{ZS}]$ corresponding to the $X_S$-axis magnetic flux density $B_{XS}$, the $Y_S$-axis magnetic flux density $B_{YS}$, and the $Z_S$-axis magnetic flux density $B_{ZS}$ in the raw measurement data collected by the correction part 46 has a distribution along the surface of a specific ellipsoid SPH determined by a set of gain values $[(G_B)_{XS}, (G_B)_{YS}, (G_B)_{ZS}]$ in the $(V_B)_{XS}(V_B)_{YS}(V_B)_{ZS}$ coordinate system, as shown in FIG. 8. When all the gains $(G_B)_{XS}$, $(G_B)_{YS}$, and $(G_B)_{ZS}$ are equal to each other, the ellipsoid SPH is a sphere. Hereinafter, it is assumed that all the gain values $(G_B)_{XS}$, $(G_B)_{YS}$, and $(G_B)_{ZS}$ are equal to each other.

On the other hand, when the noise magnetism greatly varies with time in the $X_S$ axis direction, the $Y_S$ axis direction, and the $Z_S$ axis direction, the set of detection voltage values $[(V_B)_{XS}, (V_B)_{YS}, (V_B)_{ZS}]$ are not distributed along the surface of a specific sphere SPH in the $(V_B)_{XS}(V_B)_{YS}(V_B)_{ZS}$ coordinate system.

Accordingly, when the set of detection voltage values $[(V_B)_{XS}, (V_B)_{YS}, (V_B)_{ZS}]$ does not have a distribution along the circumference of the specific sphere SPH, the correction part 46 judges that the offset values of the detection voltage values $(V_B)_{XS}$, $(V_B)_{YS}$, and $(V_B)_{ZS}$ cannot be corrected because noise magnetism greatly varying with time exists. The correction part 46 notifies the collection control part 49 of the judgment result. The collection control part 49 having received the notification displays the notification details on the display unit 13 to notify the user of the details. In this way, the correction process is ended.

When the set of detection voltage values $[(V_B)_{XS}, (V_B)_{YS}, (V_B)_{ZS}]$ has the distribution along the circumference of the specific sphere SPH, the correction part 46 first calculates center coordinates $[(V_{BO})_{XS}, (V_{BO})_{YS}, (V_{BO})_{ZS}]$ and a radius r of the sphere SPH. Subsequently, the correction part 46 judges whether the radius r corresponds to the length corresponding to the standard magnitude $B_E$ of the magnetic flux density derived from only the terrestrial magnetism with the allowable precision.

When the gain values $(G_B)_{XS}$, $(G_B)_{YS}$, and $(G_B)_{ZS}$ are not equal to each other, the correction part judges whether the diameters of the ellipsoid SPH in the $X_S$ axis direction, the $Y_S$ axis direction, and the $Z_S$ axis direction correspond to the length corresponding to the standard magnitude $B_E$ of the magnetic flux density derived from only the terrestrial magnetism with the allowable precision.

When the judgment result is negative, the correction part judges that the offset values of the detection voltage values $[(V_B)_{XS}, (V_B)_{YS}, (V_B)_{ZS}]$ cannot be corrected because the noise magnetism is normal but interferes with the measurement of the terrestrial magnetism with the allowable precision. Then, the correction part 46 notifies the collection control part 49 of the judgment result. The collection control part 49 having received the judgment result displays the notification details on the display unit 13 to notify the user of the details. In this way, the correction process is ended.

On the other hand, when the judgment result is affirmative, the correction part 46 selects the values $(V_{BO})_{XS}$, $(V_{BO})_{YS}$, and $(V_{BO})_{ZS}$ as new offset values of the detection voltage values $(V_B)_{XS}$, $(V_B)_{YS}$, and $(V_B)_{ZS}$. Subsequently, the correction part 46 stores the values $(V_{BO})_{XS}$, $(V_{BO})_{YS}$, and $(V_{BO})_{ZS}$ as the corrected offset values of the detection voltage values $(V_B)_{XS}$, $(V_B)_{YS}$, and $(V_B)_{ZS}$ in the storage unit 23. The correction part 46 sends to the collection control part 49 the fact that the offset values of the detection voltage values $(V_B)_{XS}$, $(V_B)_{YS}$, and $(V_B)_{ZS}$ are corrected. The collection control part 49 having received the fact displays the notification details on the display unit 13 to notify the user of the details. In this way, the correction process is ended.

<Measurement Data Collecting Process and Measurement Data Notifying Process>

Next, the measurement data collecting process of the measurement data processing part 35 will be described.

The measurement environment estimating part 42 sends to the notification data calculating part 44 the estimation result and the magnetic flux density components and acceleration components calculated by the measured physical quantity calculating part 41 just before the estimation process, at the same time as notifying the estimation result display part 43 of the estimation result. The notification data calculating part 44 having received the data calculates the pitch angle $\theta_X$, the roll angle $\theta_Y$, the yaw angle $\theta_Z$, the X-axis acceleration $\alpha_X$, and the Y-axis acceleration $\alpha_Y$ on the basis of the data received from the measurement environment estimating part 42. Subsequently, the notification data calculating part 44 sequentially stores in the measurement data regions $MDR_j$ the measurement environment estimation result, the pitch angle $\theta_X$, the roll angle $\theta_Y$, the yaw angle $\theta_Z$, the X-axis acceleration $\alpha_X$, and the Y-axis acceleration $\alpha_Y$ by using the temporary storage area 24 as a ring buffer. The notification data calculating part 44 notifies the collection control part 49 of address information of the measurement data regions $MDR_j$ in the unit of the measurement data regions $MDR_j$.

In this way, when the measurement data processing part 35 collects the measurement data and the application 33 issues a request for measurement data, the collection control part 49 of the measurement data processing part 35 receives the request for measurement data. The collection control part 49 having received the request for measurement data sends to the data notification part 45 the address in the temporary storage area 24 in which the measurement data to be notified is stored and the number of measurement data to be notified. The data notification part 45 having received the notification reads out the measurement environment estimation result, the pitch angle $\theta_X$, the roll angle $\theta_Y$, the yaw angle $\theta_Z$, the X-axis acceleration $\alpha_X$, and the Y-axis acceleration $\alpha_Y$ which are the notification data with reference to the address in the temporary area 24, and sends the readout data to the application 33.

The application 33 performs a predetermined operation by the use of the measurement environment estimation result and the measurement data received from the data notification part 45. In this embodiment, the application 33 judges whether the measurement data is usable with reference to the measurement environment estimation result. When it judges that the measurement data is not usable, the application displays the fact on the common region CR of the display unit 13.

As described above, in the cellular phone 10 according to this embodiment, the measured physical quantity calculating part 41 calculates the magnetic flux density corresponding to the measurement result of the sensor unit 25 by the use of the corrected characteristic values of the sensor unit 25. Subsequently, the measurement environment estimating part 42 estimates the terrestrial magnetism measurement environment on the basis of the calculation result of the measured physical quantity calculating part 41. Therefore, according to the cellular phone 10 of this embodiment, it is possible to estimate the terrestrial magnetism measurement environment by the use of the sensor unit 25 and to measure the terrestrial magnetism by the use of the sensor unit 25.

In the cellular phone 10 of this embodiment, the measurement environment estimating part 42 calculates the beyond-range ratio which is the ratio of the measurement results, the differences of which from the average value of a plurality of measurement results are beyond a predetermined range, to the plurality of measurement results of the sensor unit 25. The measurement environment estimating part 42 estimates the terrestrial magnetism measurement environment on the basis of the calculation result obtained from the measured physical quantity calculating part 41 and the beyond-range ratio. Accordingly, it is possible to estimate the terrestrial magnetism measurement environment with high precision.

In the cellular phone 10 of this embodiment, the data notification part 45 reports the estimation result of the measurement environment estimating part 42 to the application 33 along with the measurement data, in response to the request for measurement data corresponding to the measurement results of the sensor unit 25 which is sent from the application 33. Accordingly, the application 33 judges the reliability of the reported measurement data and performs a proper process in accordance with the estimation result.

Although the terrestrial magnetism measurement environment has been estimated by three steps in this embodiment, the terrestrial magnetism measurement environment may be estimated by two steps or by four steps. When the terrestrial magnetism measurement environment is estimated by two steps, for example, the two steps include a green-level environment estimation of this embodiment and the other estimation. When the terrestrial magnetism measurement environment is estimated by four steps, for example, the allowable measurement precision is set to multiple steps and the green-level environment measurement of this embodiment can be divided into plural steps corresponding to the steps of the allowable measurement precision.

While the correction result of the correction part 46 is stored in the storage unit 23, a user can be allowed to confirm the correction result. In this case, the specific procedure is as follows. When the calculation of a new correction result is completed, the correction part 46 sends the fact to the collection control part 49. Then, the collection control part 49 displays on the display unit 13 a picture for checking whether the new correction result should be stored. When the user having viewed the picture operates the keys of the operation unit 12 to input a storage instruction, the collection control part 49 sends the instruction to the correction part 46. The correction part 46 having received the instruction stores the new correction result in the storage unit 23 and ends the correction process. On the other hand, when the user inputs an instruction for not storing the new correction result, the collection control part 49 sends the instruction to the correction part 46. Then, the correction part 46 does not store the new correction result in the storage unit 23 and ends the correction process.

Although a so-called five-axis sensor for measuring the magnetic flux density in three axis directions and measuring the acceleration in two axis directions bas been used as the sensor unit 25, a six-axis sensor for measuring the acceleration in three axis directions similarly to the magnetic flux density may be used as the sensor unit. In this case, the terrestrial magnetism measurement environment can be estimated by three steps, similarly to the above-mentioned embodiment.

In the above-mentioned embodiment, the sensor unit 25 has been built in the cellular phone 10. However, the sensor unit 25 may be disposed outside the cellular phone 10 and the sensor unit 25 may be connected to the cellular phone 10 through an interface port (not shown) of the cellular phone 10 for connection to an external device.

In the above-mentioned embodiment, a so-called straight type cellular phone has been used in which the relative position between the operation unit 12 in which the keys are arranged and the display unit 13 is fixed. However, in a cellular phone such as a clam shell type or revolver type cellular phone in which the relative position between the operation unit and the display unit is variable, the sensor unit 25 may be disposed on a side of the operation unit or may be disposed on a side of the display unit. The axis direction as a reference for measurement of the sensor unit 25 can be determined depending on the disposal position of the sensor unit 25 or the types of the cellular phone.

In the above-mentioned embodiments, the invention has been applied to the cellular phone. However, the invention may be applied to other types of mobile information devices such as portable game devices, car navigation devices, and PDAs (Personal Digital Assistances).

As described above, the measurement method according to the invention can be applied to the measurement of a terrestrial magnetism using a magnetic sensor mounted on a mobile information device. The mobile information device according to the invention can be applied to a mobile information device for measuring the terrestrial magnetism by the use of a magnetic sensor mounted thereon.

What is claimed is:

1. A measurement method of measuring a magnetic flux density derived from terrestrial magnetism by the use of a sensor mounted on a mobile information device, the measurement method comprising;

a magnetic flux density calculating step of calculating a magnetic flux density corresponding to the measurement result of the sensor by the use of a corrected characteristic value of the sensor;

a measurement environment estimating step of estimating a terrestrial magnetism measurement environment on the basis of the calculation result of the magnetic flux calculating step; and a beyond-range ratio calculating step of calculating a beyond-range ratio which is a ratio of measurement results, differences of which from an average value of a plurality of measurement results of the sensor are beyond a predetermined range, to the plurality of measurement results, wherein the measurement environment estimating step includes estimating the terrestrial magnetism measurement environment on the basis of the calculation result of the magnetic flux density calculating step and the beyond-range ratio.

2. The measurement method according to claim 1, further comprising an estimation result display step of displaying the estimation result of the measurement environment estimating step on a display unit of the mobile information device.

3. The measurement method according to claim 1, further comprising a measurement data reporting step of reporting the measurement data and the estimation result of the measurement environment estimating step in response to a request for measurement data corresponding to the measurement result of the sensor which is sent from an application operating in the mobile information device.

4. The measurement method according to claim 1, wherein the sensor measures magnetic flux densities in three axis directions perpendicular to each other and defined uniquely in the mobile information device.

5. A mobile information device comprising:
a sensor for measuring a magnetic flux density;
magnetic flux density calculating means for calculating a magnetic flux density corresponding to a new measurement result of the sensor by the use of corrected characteristic values of the sensor;
measurement environment estimating means for estimating a terrestrial magnetism measurement environment on the basis of the calculation result of the magnetic flux density calculating means; and
beyond-range ratio calculating means for calculating a beyond-range ratio which is a ratio of measurement results, differences of which from an average value of a plurality of measurement results of the sensor are beyond a predetermined range, to the plurality of measurement results, wherein the measurement environment estimating means estimates the terrestrial magnetism measurement environment on the basis of the calculation result of the magnetic flux density calculating means and the beyond-range ratio.

6. The mobile information device according to claim 5, further comprising:
a display unit for notifying a user of information; and
estimation result displaying means for displaying the estimation result of the measurement environment estimating means on the display unit.

7. The mobile information device according to claim 5, further comprising measurement data reporting means for reporting the measurement data and the estimation result of the measurement environment estimating means in response to a request for measurement data corresponding to the measurement result of the sensor which is sent from an application.

8. The mobile information device according to claim 5, wherein the sensor measures magnetic flux densities in three axis directions perpendicular to each other.

9. The mobile information device according to claim 5, further comprising a radio communication unit for performing a radio communication with a base station of a mobile communication network.

* * * * *